US012743078B2

(12) United States Patent
Resag et al.

(10) Patent No.: US 12,743,078 B2
(45) Date of Patent: Sep. 22, 2026

(54) MODELING PRODUCTION PROCESSES TO INCLUDE INTERMEDIATE PRODUCTS

(71) Applicant: SAP SE, Walldorf (DE)

(72) Inventors: Stefan Resag, Walldorf (DE); V Krishna Anaparthi, Bangalore (IN); Iris Zimmermann, Speyer (DE)

(73) Assignee: SAP SE, Walldorf (DE)

( * ) Notice: Subject to any disclaimer, the term of this patent is extended or adjusted under 35 U.S.C. 154(b) by 570 days.

(21) Appl. No.: 18/222,130

(22) Filed: Jul. 14, 2023

(65) Prior Publication Data

US 2025/0021087 A1 Jan. 16, 2025

(51) Int. Cl.
*G05B 19/418* (2006.01)

(52) U.S. Cl.
CPC . *G05B 19/41885* (2013.01); *G05B 19/41865* (2013.01); *G05B 2219/31319* (2013.01)

(58) Field of Classification Search
CPC .... G05B 19/41865; G05B 2219/31455; G05B 19/4188; G06F 16/51; G06F 16/54; G06F 3/048; G06Q 10/06; G06Q 10/0875; G06Q 10/0877
USPC ............................................ 700/115; 705/28
See application file for complete search history.

(56) References Cited

U.S. PATENT DOCUMENTS

2003/0200130 A1* 10/2003 Kall .................. G06Q 10/0637 705/7.11
2003/0233290 A1* 12/2003 Yang ...................... G06Q 10/06 705/28
2007/0192715 A1* 8/2007 Kataria ................ G06Q 10/087 705/28
2007/0233728 A1* 10/2007 Puteick .................. G06Q 10/06
2008/0021754 A1* 1/2008 Horn .................. G06Q 30/0202 705/7.31
2008/0154414 A1* 6/2008 Lokowandt ............ G06Q 10/06 700/107
2014/0067105 A1* 3/2014 Reggio .................. G05B 15/02 700/97

(Continued)

OTHER PUBLICATIONS

"SAP Business ByDesign Library", SAP SE, [Online]. Retrieved from the Internet: <URL: https://help.sap.com/docs/SAP_BUSINESS_BYDESIGN/2754875d2d2a403f95e58a41a9c7d6de?locale=en-US&state=PRODUCTION&version=2305>, (May 2023), 10 pgs.

*Primary Examiner* — Ronald D Hartman, Jr.
(74) *Attorney, Agent, or Firm* — SCHWEGMAN LUNDBERG & WOESSNER, P.A.

(57) ABSTRACT

Example methods and systems relate to the modeling of production processes to include intermediate products. An enterprise resource planning (ERP) system receives user input to define an intermediate product, and generates a master data record for the intermediate product. The ERP system further receives user input to include the intermediate product in a production model within the ERP system. The production model is associated with a real-world production process. The production model is updated based on the master data record to integrate the intermediate product into a sequence of activities. The sequence of activities comprises a first activity that produces the intermediate product and a second activity that consumes the intermediate product. The ERP system executes a production order based on the production model. Execution of the production order includes tracking state information of the intermediate product within the ERP system.

20 Claims, 12 Drawing Sheets

(56) References Cited

U.S. PATENT DOCUMENTS

2014/0095249 A1* 4/2014 Tarakad ............. G06Q 30/0633
705/7.25

* cited by examiner

MODELING PRODUCTION PROCESSES TO INCLUDE INTERMEDIATE PRODUCTS

TECHNICAL FIELD

The subject matter disclosed herein relates to the use of computer systems to model real-world production processes, and to the controlling or tracking of real-world production processes based on such models.

BACKGROUND

An enterprise resource planning (ERP) system can be used to create a model of a real-world production process, such as a manufacturing process, and to control and track aspects of a production order based on the model. A typical production process comprises a plurality of operations or steps, referred to herein as "activities." Each activity can have one or more inputs (e.g., the activity may consume raw materials) and produces one or more outputs (e.g., raw materials may be converted to a new state), with the activities leading to the production of a final product. The term "intermediate product," as used in this disclosure, refers to a product that is created during one activity of a production process and consumed in another activity of the same production process.

The presence of intermediate products may give rise to technical challenges in the context of an ERP system. In some cases, an ERP system may be unable to provide adequate transparency with respect to intermediate products. For example, when an activity involving an intermediate product is outsourced, the ERP system may lack the functionality to allow for the tracking of state information (e.g., location or inventory level) of the intermediate product. When a production process is halted in an intermediate state, e.g., due to a machine breakdown or an order cancellation, the ERP system may also be unable to provide sufficient state information of intermediate products that exist in the intermediate state. These issues may impair the performance of the ERP system, e.g., by resulting in deficiencies or anomalies within the production control, inventory, material tracking, or financial components of the ERP system.

BRIEF DESCRIPTION OF THE DRAWINGS

Some examples are shown for purposes of illustration and not limitation in the figures of the accompanying drawings. In the drawings, which are not necessarily drawn to scale, like numerals may describe similar components in different views or examples. To identify the discussion of any particular element or act more easily, the most significant digit or digits in a reference number refer to the figure number in which that element is first introduced.

DETAILED DESCRIPTION

Figure 1:
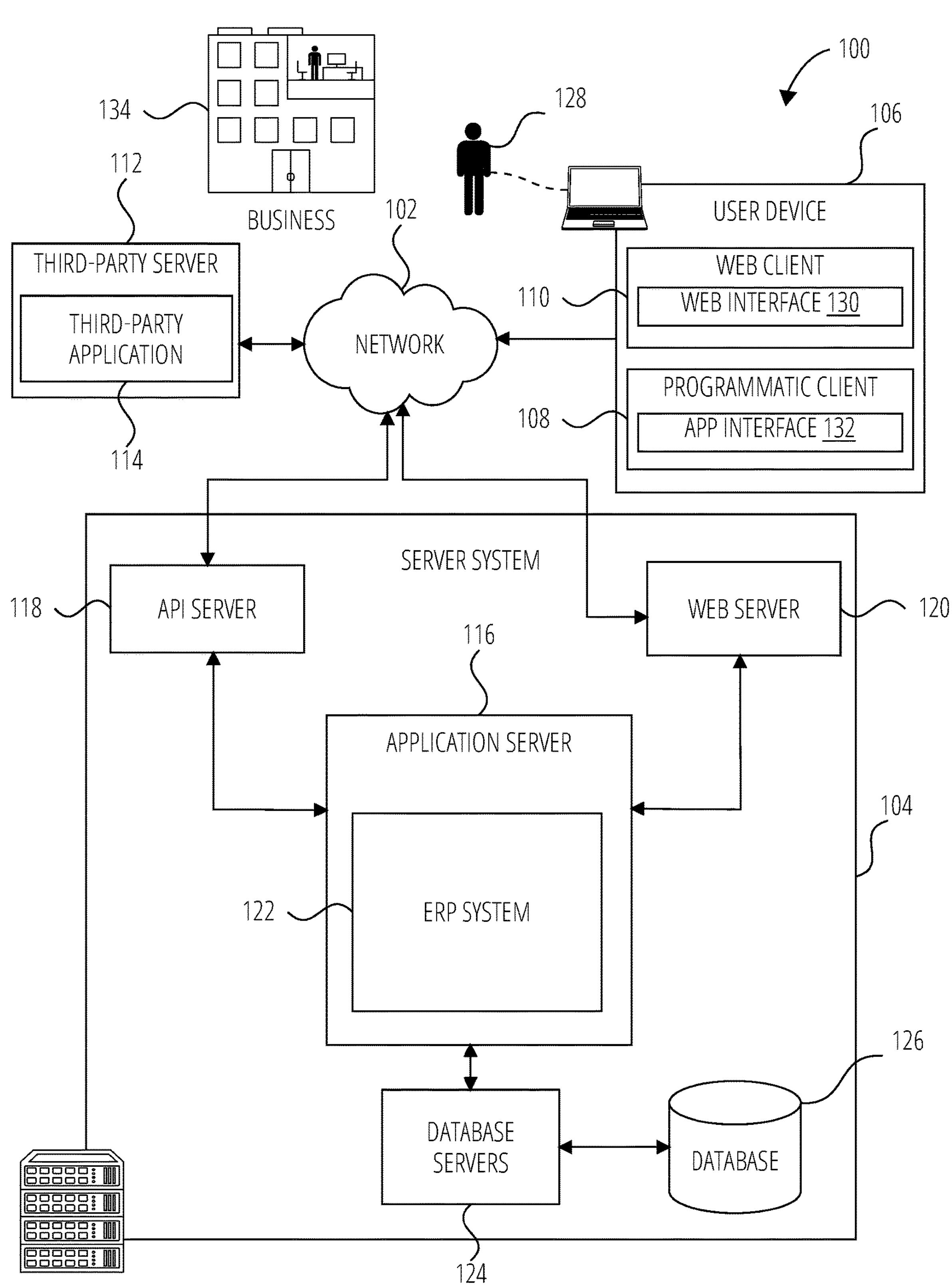
FIG. 1 is a diagrammatic representation of a network environment suitable for implementing an ERP system, according to some examples.

Examples of the present disclosure provide techniques suitable for modeling real-world production processes to enable improved control or tracking of such real-world production processes, e.g., in the context of an ERP system. The term "ERP system," as used in this disclosure, refers to any software-based system that facilitates or supports business functions, such as one or more of supply chain, logistics, procurement, human resources, manufacturing, services, research and development, engineering, and finance. An ERP system can help users associated with a business to design, manage, control, track, automate, or optimize one or more of these functions. In some cases, a business uses its ERP system as a system of record with respect to the running of day-to-day business operations.

The term "production model," as used in this disclosure, refers to a digital representation of how a product is manufactured or a service is provided. A production model may provide a blueprint of a real-world production process within an ERP system, including activities, steps, components, and resources required in the process. An ERP system may include one or more software tools for creating and adjusting a production model, and for executing a production order based on the production model. A production model may include a combination of a Bill of Materials (BOM) and a Bill of Operations (BoO). However, the term "production model" is not limited to a particular modeling type or format. The term "production order," as used in this disclosure, refers to an instruction that initiates, or is used to execute, the production of one or more products according to a blueprint provided by a production model.

The term "product component," as used in this disclosure, refers to a basic material or part, such as raw material, used in a production process. A product component can be converted or transformed into an intermediate product or into a final product. As used in this disclosure, the term "final product" refers to one or more completed items. The final product is the result of the production order or the outcome that the real-world production process is designed to achieve.

Merely as an example, a production process may involve creating a final product in the form of a metal box by performing the following activities (in the order stated): cutting a metal sheet, painting the cut sheet, and assembling the painted sheet using screws. In some cases, this production process may be modeled in an ERP system without defining its intermediate products, e.g., by simply modeling the production process by relating the product components (the metal sheet, paint, and screws), the activities (the cutting, painting, and assembling), and the final product to each other. However, if this approach is adopted, the ERP system may be unable to provide transparency with respect to intermediate products that exist at certain times during the production process, e.g., the ERP system cannot be used to track or control warehousing processing related to the cut sheet that exists prior to the painting activity, and the painted sheet that exists prior to the assembling activity.

Still referring to the metal box example, another option may be to model each activity (the cutting, painting, and assembling) as a separate production process, resulting in the respective intermediate products (the cut sheet and the painted sheet) essentially being modeled as final products within separate production models in the ERP system. In this way, the ERP system may allow for a greater degree of visibility with respect to the intermediate products. However, given that this approach necessitates the creation of additional production models, as well as the linking of the relevant production models within the ERP system, it may increase the resources required to design and manage production, including the computing resources used by the ERP system.

Example methods and systems allow for the modeling of production processes to include intermediate products without the need to model each activity as a separate production process. An ERP system may receive user input to define an intermediate product (e.g., the cut sheet of the example described above). The ERP system may, based on the user input, generate a master data record for the intermediate product. The term "master data record," as used in this disclosure, refers to a global, central, or standardized source of information about a product or service offered by a business. The master data record for a product may refer to any data record that uniquely identifies the product and one or more features or properties of the product within the ERP system. The master data record may include product information, such as a product name, product identifier, product description, or units of measure. The master data record may further include one or more of pricing or costing information, inventory information, supply chain information, and sales and marketing information.

In some examples, the ERP system adds an intermediate product indicator to the master data record of the intermediate product. The intermediate product indicator may uniquely identify the intermediate product or may distinguish the intermediate product from other items, such as the product components and final product within the same production model. The intermediate product indicator may be an intermediate product flag.

The ERP system may receive user input to include the intermediate product in the production model within the ERP system. As mentioned, the production model is associated with a real-world production process, e.g., a manufacturing process. The production model is updated based on the master data record to integrate the intermediate product into a sequence of activities of the production model. The sequence of activities comprises at least a first activity that produces the intermediate product and a second activity that consumes the intermediate product.

Once a production order has been received or initiated, e.g., for a specific quantity of final products, the ERP system may execute the production order based on the production model. Execution of the production order includes tracking state information of the intermediate product within the ERP system. The state information may include one or more of: an inventory level of the intermediate product, an inventory value of the intermediate product (e.g., a monetary value), a location of one or more units of the intermediate product, a location of a quantity of the intermediate product, batch information, or serial number information. In this way, the ERP system may provide enhanced transparency with respect to intermediate products.

Examples of the present disclosure provide a useful tool that enables simplified modeling of production processes while providing enhanced functionality for tracking state information of an intermediate product, e.g., to support warehouse processes, logistics, and inventory management, or to provide insights generatable by the ERP system. According to some examples, intermediate products can be tracked without necessitating the subdividing or slicing of production models into smaller parts, or without issuing smaller production orders. An ERP system as described herein may also enhance other ERP system functionality, such as the management of outsourcing processes (e.g., subcontracting of activities to third-party suppliers).

Various types of manufacturers, including, for example, discrete, batch, or continuous process manufacturers, rely on ERP systems to meet production targets, manage resources, control processes, and so forth. Examples described herein may improve the functioning of an ERP system by enhancing its tracking capabilities and reducing the risk of data anomalies, such as inventory issues resulting from the halting of production processes.

When the effects in this disclosure are considered in aggregate, one or more of the methodologies described herein may obviate a need for certain efforts or resources that otherwise would be involved in running ERP systems. Computing resources used by one or more machines, databases, or networks may be more efficiently utilized or even reduced, e.g., a result of a reduction in the number of production processes or production orders created, executed, or tracked within the ERP system. Examples of such computing resources may include processor cycles, network traffic, memory usage, graphics processing unit (GPU) resources, data storage capacity, power consumption, and cooling capacity.

FIG. 1 is a diagrammatic representation of a networked computing environment 100 in which some examples of the present disclosure may be implemented or deployed. One or more servers in a server system 104 provide server-side functionality via a network 102 to a networked device, in the example form of a user device 106 that is accessed by a user 128 associated with a business 134. A web client 110 (e.g., a browser) or a programmatic client 108 (e.g., an "app") may be hosted and executed on the user device 106.

An Application Program Interface (API) server 118 and a web server 120 provide respective programmatic and web interfaces to components of the server system 104. A specific application server 116 hosts an ERP system 122, which includes components, modules, or applications, that facilitate or support business functions, such as one or more of supply chain, logistics, procurement, human resources, manufacturing, services, research and development, engineering, and finance.

The user device 106 can communicate with the application server 116, e.g., via the web interface supported by the web server 120 or via the programmatic interface provided by the API server 118. It will be appreciated that, although only a single user device 106 is shown in FIG. 1, a plurality of user devices may be communicatively coupled to the server system 104 in some examples. Further, while certain functions may be described herein as being performed at either the user device 106 (e.g., web client 110 or programmatic client 108) or the server system 104, the location of certain functionality either within the user device 106 or the server system 104 may be a design choice.

The application server 116 is communicatively coupled to database servers 124, facilitating access to one or more information storage repository, e.g., a database 126. In some examples, the database 126 includes storage devices that store information to be processed or transmitted by the ERP system 122.

The application server 116 accesses application data (e.g., application data stored by the database servers 124) to provide one or more applications or tools to the user device 106 via a web interface 130 or an app interface 132. For example, and as described further below according to examples and with specific reference to FIGS. 2-10, the application server 116, using the ERP system 122, may provide functionality enabling the user 128 to create a production model, and to execute and track production orders based on the production model.

To access the tools provided by the ERP system 122, the user 128 may create an account with an entity associated with the server system 104, e.g., a service provider (or access an existing account with the entity). The user 128 may use account credentials to access the web interface 130 (via a suitable web browser) and request access to one or more of the tools. The user 128 may also, in some examples, access the tools using a dedicated programmatic client 108, in which case some functionality may be provided client-side and other functionality may be provided server-side. The ERP system 122 may provide user interfaces facilitating communication between the user 128 and the ERP system 122, or between different users of the ERP system 122.

In some examples, the application server 116 is part of a cloud-based platform provided by the entity associated with the server system 104 that allows an account holder to utilize the various tools of the ERP system 122. For example, the user 128 may access the ERP system 122 by accessing one or more cloud instances. This may be referred to as "cloud ERP." With cloud ERP, ERP software is hosted in the cloud and delivered to the user 128 as a service. However, in other examples, the ERP system 122 may be deployed as an on-premise ERP system or as a hybrid system, where some applications, features or tools are hosted in the cloud, and others are provided on premise.

The ERP system 122 may enable real-time tracking of business activities of the business 134. For example, ERP system 122 may capture data at each stage of a production process, enabling immediate updates and visibility. In this way, a digital or virtual production model can be aligned with the actual process by continuously updating information and reflecting real-world changes in the system. The ERP system 122 may also allow for the automation of tasks and may automatically trigger tasks, e.g., based on detecting completion of other tasks within the real-world production process.

Examples described herein may be applied to different types of intermediate products. Examples include batch, non-batch, and serialized intermediate products that exist in the context of a production process.

One or more of the application server 116, the database servers 124, the API server 118, the web server 120, and the ERP system 122 may each be implemented in a computer system, in whole or in part, as described below with respect to FIG. 12. In some examples, third-party applications, such as a third-party application 114 executing on a third-party server 112, can communicate with the application server 116 via the programmatic interface provided by the API server 118. For example, a third-party application may support one or more features or functions on a website or platform hosted by a third party, or may perform certain methodologies and provide input or output information to the application server 116 for further processing or publication. For example, a manufacturing process may utilize hardware from a hardware provider, and the third-party server 112 may be a server of the hardware provider that is used to transmit hardware-related data, e.g., maintenance data or performance data, to the ERP system 122 for integration with other manufacturing process data.

The network 102 may be any network that enables communication between or among machines, databases, and devices. Accordingly, the network 102 may be a wired network, a wireless network (e.g., a mobile or cellular network), or any suitable combination thereof. The network 102 may include one or more portions that constitute a private network, a public network (e.g., the Internet), or any suitable combination thereof.

Figure 2:
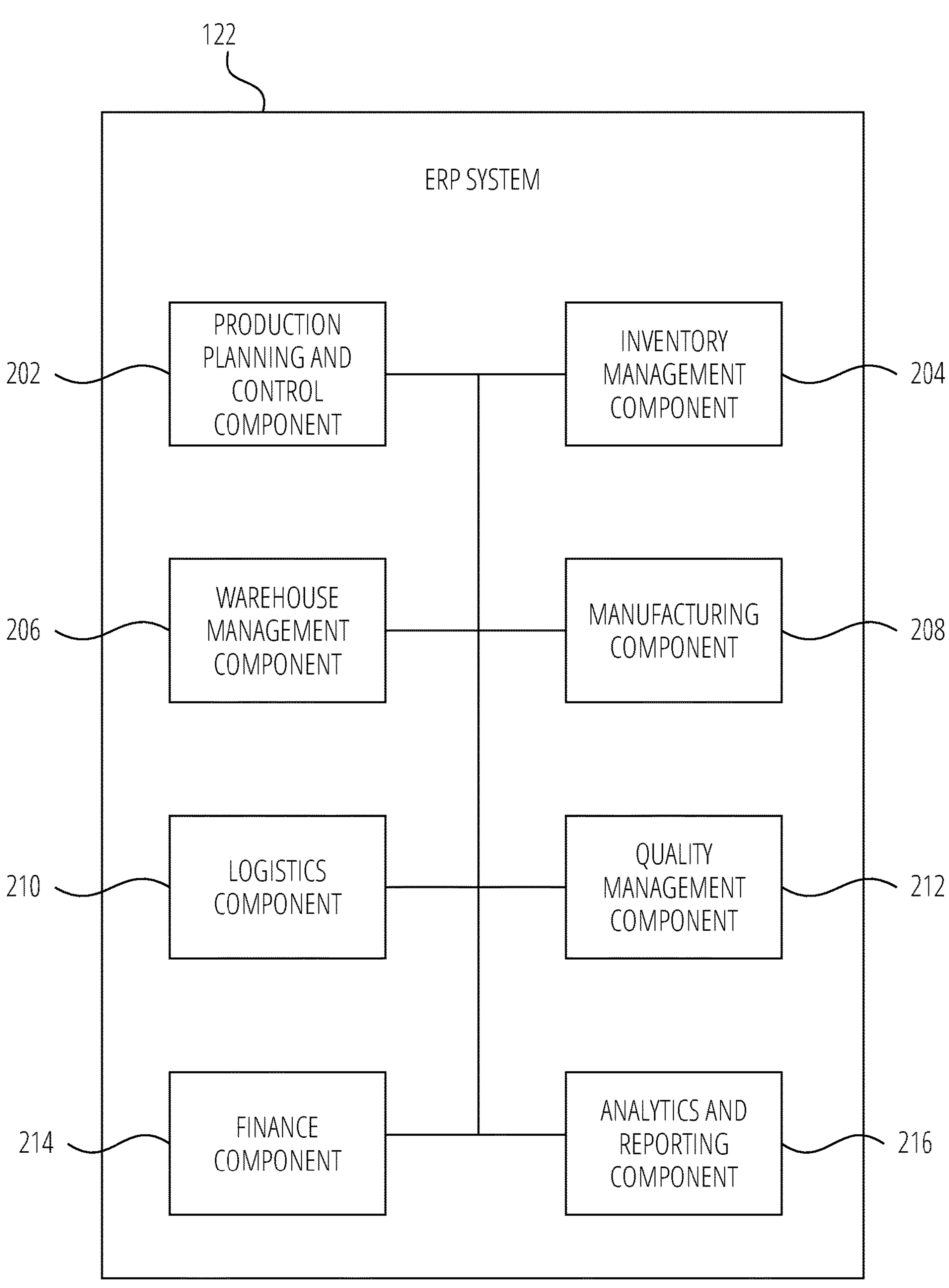
FIG. 2 is a block diagram of certain components of an ERP system, according to some examples.

FIG. 2 is a block diagram illustrating certain components of the ERP system 122 of FIG. 1, according to some examples. The ERP system 122 is shown as including a production planning and control component 202, an inventory management component 204, a warehouse management component 206, a manufacturing component 208, a logistics component 210, a quality management component 212, a finance component 214, and an analytics and reporting component 216. It is noted that the components in FIG. 2 are illustrative of possible components of an ERP system and not intended to provide an exhaustive indication of such possible components.

In some examples, at least some of the components shown in FIG. 2 are configured to communicate with each other to implement aspects described herein. Any one or more of the components described herein may be implemented using hardware (e.g., one or more processors of one or more machines) or a combination of hardware and software. For example, any component described herein may be implemented by a processor configured to perform the operations described herein for that component. Moreover, any two or more of these components may be combined into a single component, or the functions described herein for a single component may be subdivided among multiple components. Furthermore, according to various examples, components described herein may be implemented using a single machine, database, or device, or be distributed across multiple machines, databases, or devices.

The production planning and control component 202 is responsible for numerous aspects of production, such as facilitating planning production processes, executing production orders, procurement tasks, and purchasing. The user 128 may use the production planning and control component 202 to automate various aspects of a production process, e.g., such that activities automatically move from one stage to another once certain criteria are met.

The production planning and control component 202 may be used for the building of production models. A production model can include data such as a BoM, activity details (e.g., as part of a BoO), work instructions, resource allocations, and routing information. In some examples, once a production model is released to production, it becomes the blueprint for manufacturing a particular final product. The ERP system 122 may use this blueprint to automatically generate production orders, schedule tasks, allocate resources (e.g., reserve materials and allocate workers), or manage and adjust inventory. Production orders contain detailed instructions for manufacturing or producing a specific quantity of the final product, including the activities, materials and resources required for this purpose, based on the production model.

In some examples, the production planning and control component 202 is responsible for identifying or predicting demand for a product. This may, for example, be based on a sales order that has been placed by a customer, or a forecast of future demand based on sales history and trends. The production planning and control component 202 may generate production proposals based on identified demand. In some examples, a production order is created in response to a production proposal being accepted, or a production order is automatically created according to a predefined schedule.

During execution of a production process, as each activity is performed, the production planning and control component 202 may automatically update the production order to reflect progress and changes. This may include triggering tracking of state information for various materials or items, such as the consumption or inventory levels associated with a particular material. The production planning and control component 202 may trigger the inventory management component 204 to adjust inventory levels and the quality management component 212 to perform quality control tasks.

In some examples, the ERP system 122 stores and applies master data, including a master data record for each of a plurality of products. As will be described further below, in some examples, the production planning and control component 202 generates a unique master data record for an intermediate product that defines various features or properties of the intermediate product. In some cases, the master data record is enhanced or enriched to allow the intermediate product to be modeled as an inventory-managed product, a location-tracked product, or both, thus enhancing transparency of the intermediate product within the ERP system 122.

The inventory management component 204 is configured to track inventory levels of product components, intermediate products, and final products. The inventory management component 204 may also be configured to provide the user 128 with information about inventory locations, stock transfers and adjustments. When a production order is created or issued, the inventory management component 204 may automatically reserve the necessary materials in inventory. In some examples, an item (e.g., an intermediate product or final product) is received into inventory via a goods receipt, automatically causing the inventory management component 204 to increase the inventory level of the item. When an item (e.g., a product component or intermediate product) is used in production, the inventory level is decreased via a goods issue. Goods receipts and goods issues are dynamically logged in the ERP system 122, allowing inventory levels and item movements to be tracked in real time. The warehouse management component 206 works with the inventory management component 204 to manage the physical movement of goods within or between one or more warehouses, distribution centers, or the like, including, for example, tracking storage and retrieval of items.

The manufacturing component 208 is responsible for facilitating aspects such as material requirements planning (MRP), production scheduling, and manufacturing execution. An MRP component may, together with the production planning and control component 202, automate aspects of forecasting and planning for materials required based on a production schedule. The logistics component 210 may work with the inventory management component 204 and the warehouse management component 206 to track or control the movement of goods and supplies throughout a supply chain, e.g., beyond the premises or warehouse of the business 134. For example, the logistics component 210 may facilitate transportation of items, both inbound and outbound, and may coordinate deliveries.

The quality management component 212 may be used by the business 134 to perform quality standard reviews or checks, e.g., at various stages of a production process. The quality management component 212 may be configured to perform certain quality-related tasks automatically. The finance component 214 of the ERP system 122 handles or facilitates various financial operations, such as accounting, budgeting, invoicing, purchase orders, revenue management, financial reporting, or risk management. This component may provide real-time, accurate financial information that enables businesses to monitor income, costs, and overall financial performance, or perform day-to-day financial tasks.

The analytics and reporting component 216 may provide one or more analytics and reporting features. For example, the analytics and reporting component 216 can be configured to monitor certain processes, e.g., to identify bottlenecks or areas for improvement, and to generate reports based on the findings. This may provide insights into production performance, efficiency, and costs.

Examples of the present disclosure may address or alleviate the issues identified above with respect to the transparency of intermediate products by enhancing the master data record of a product to identify it as an intermediate product. This may allow for improved handling of intermediate products within an ERP system without requiring the creation of additional production models or significantly increasing computing resource requirements of an ERP system.

Figure 3:
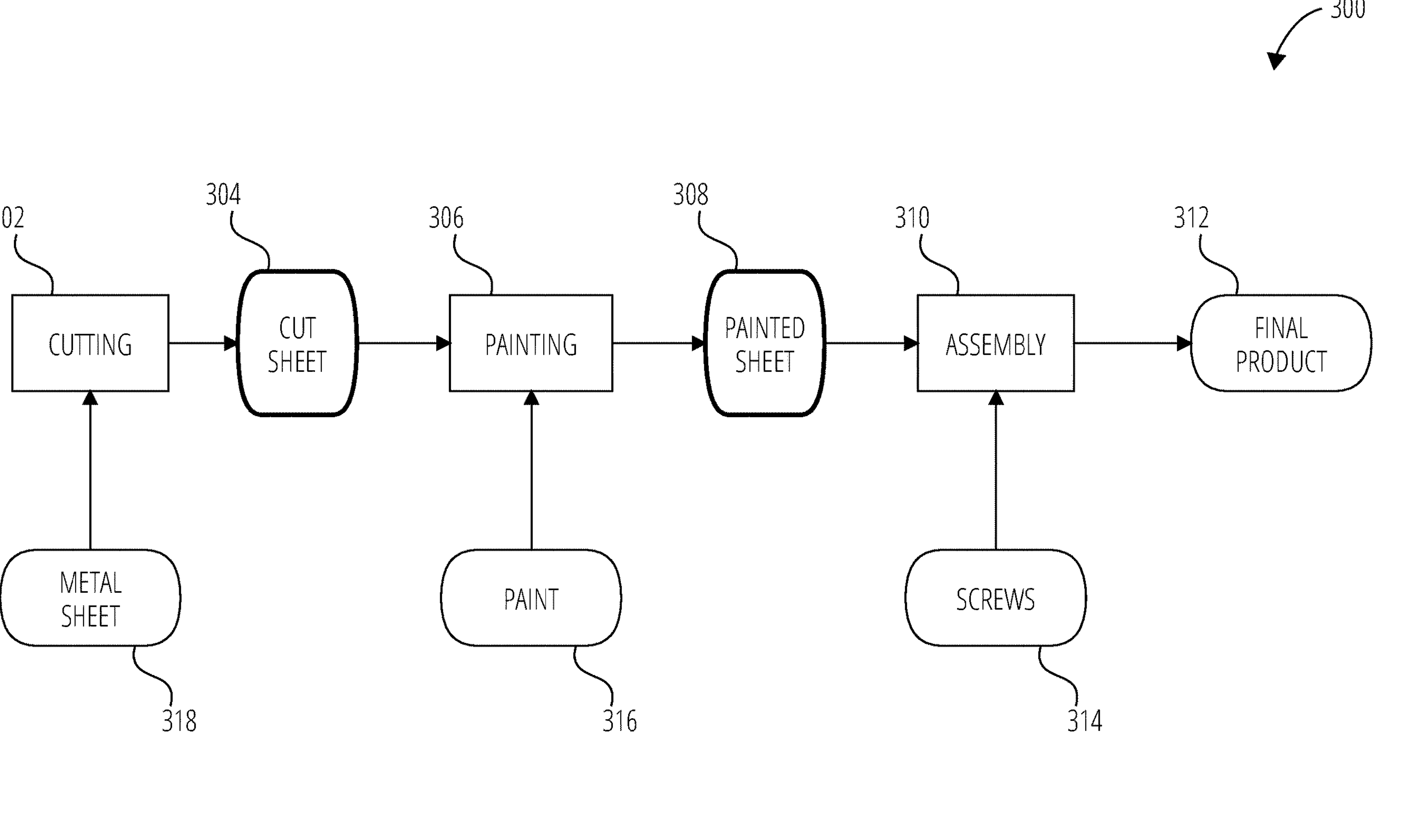
FIG. 3 is a process flow diagram illustrating a sequence of activities of a production process, according to some examples.

FIG. 3 illustrates the example production process involving the creation of a metal box, as described above, modeled using uniquely identifiable intermediate products. In FIG. 3, the production process 300 is shown to include a cutting activity 302 to cut a metal sheet 318 to create a cut sheet 304, a painting activity 306 to paint the cut sheet 304 with paint 316 to create a painted sheet 308, and an assembly activity 310 to assemble the painted sheet 308 using screws 314 to create a final product 312 (a metal box).

In the production process 300, the sequence of activities (cutting activity 302, painting activity 306, and assembly activity 310) are modeled in the ERP system 122 as activities; the metal sheet 318, paint 316, and screws 314 are modeled in the ERP system 122 as product components; and the cut sheet 304 and painted sheet 308 are modeled so as to be uniquely identifiable within and by the ERP system 122 as intermediate products.

Figure 4:
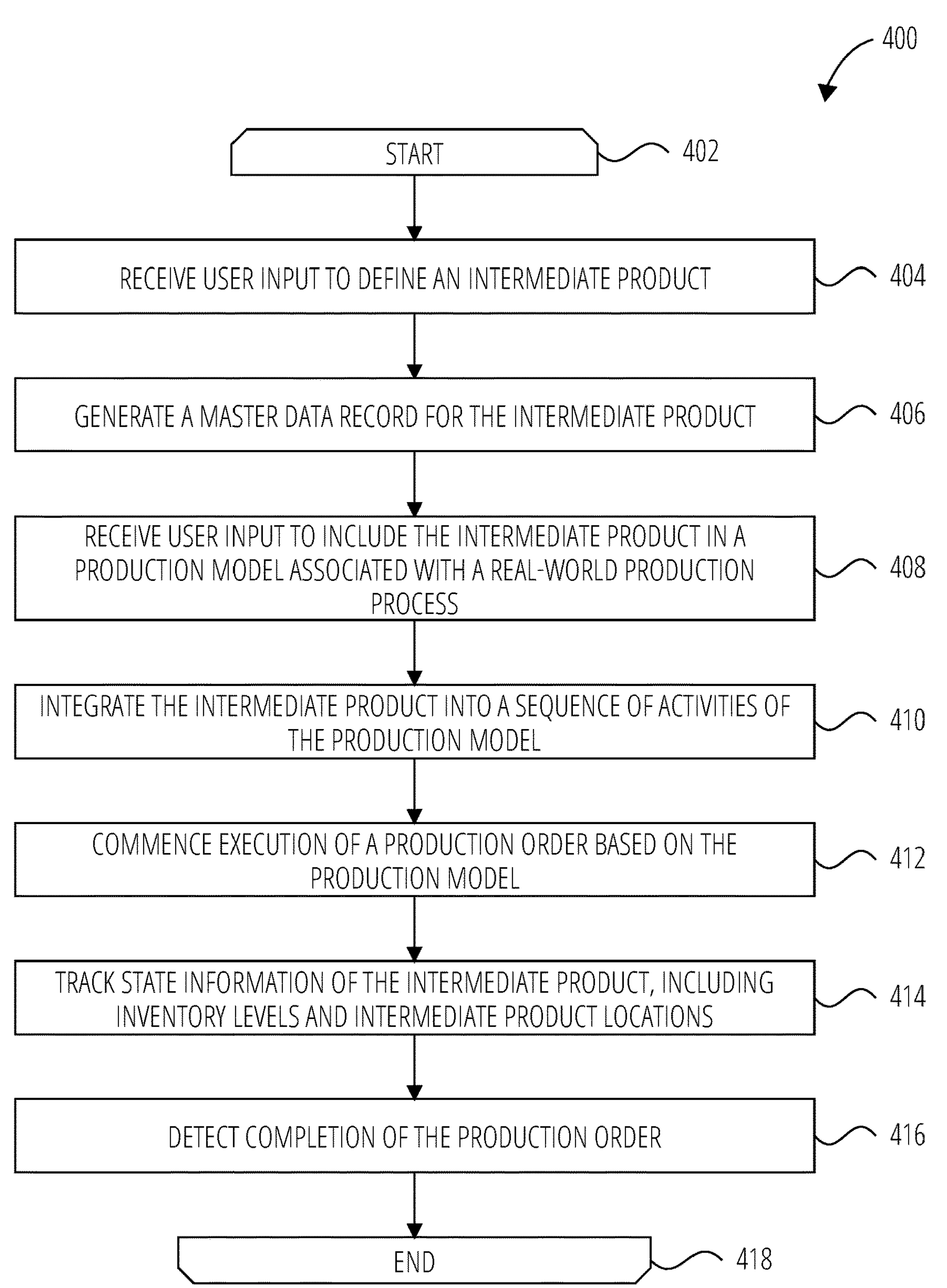
FIG. 4 is a flowchart illustrating operations of a method suitable for modeling a production process and executing a production order in the context of an ERP system, according to some examples.

FIG. 4 is a flowchart illustrating operations of a method 400 suitable for modeling a production process and executing a production order in the context of an ERP system, according to some examples. By way of example and not limitation, aspects of the method 400 may be performed by the components, devices, systems, or databases shown in FIG. 1 and FIG. 2. Furthermore, to illustrate certain aspects of the method 400, reference is made to the example production process 300 of FIG. 3.

The method 400 commences at opening loop element 402, and proceeds to operation 404 where the ERP system 122 receives user input to define an intermediate product at operation 404. The ERP system 122 generates a master data record for the intermediate product based on the user input at operation 406.

In some examples, the ERP system 122 allows the user 128 to model an intermediate product as "material," e.g., an item that can be controlled or tracked as part of warehousing or manufacturing operations, by creating a master data record in the form of a material master data record for the intermediate product. The master data record for the intermediate product may include a unique identifier, such as a product identifier, material identifier, or item identifier. In some examples, the identifier serves as an intermediate product indicator. In other examples, the master data record includes a separate intermediate product indicator, e.g., an intermediate product flag.

The flagging of an intermediate product with an intermediate product indicator allows for unique identification of the intermediate product. Further, this flag allows the ERP system 122 to distinguish the intermediate product from a final product and from product components defined in the relevant production model. Possible data that may be included in a master data record of an intermediate product, according to some examples, includes one or more of:

- Product identifier;
- Product description;
- Product type or category;
- Product details;
- Costing information;
- Intermediate product indicator, e.g., intermediate product flag;
- Stock type;
- Stock separator data;
- Based unit of measure;
- Additional unit of measure details;
- Serial number profile (e.g., providing a serial number profile to allow logistics or production processes to be supported for the intermediate product);
- Quantity conversion data (e.g., quantity of the intermediate product per final product);
- Logistics details; or
- Valuation details (e.g., whether the intermediate product should be valued at "zero").

In this way, the ERP system 122 is able to use the master data record to apply production operations, warehouse operations, shipping operations, and so forth, to the intermediate product, as described further below. In some examples, the intermediate product indicator notifies the ERP system 122 that the intermediate product is to be modeled with reduced functionality, e.g., not all functionality available for a product component or final product may be applied to the intermediate product. Examples of excluded functionality may include one or more of: purchasing features (e.g., the intermediate product cannot be purchased using a purchase order), certain planning features, availability confirmation features, sales features (e.g., the intermediate product cannot be sold), or tax features.

At operation 408, the ERP system 122 receives user input to include the intermediate product in a specific production model associated with a real-world production process. For example, the intermediate product may be the cut sheet 304 including in the production model for the production process 300.

As mentioned above, a production model provides a blueprint for how a production process is to be executed. To create the production model that includes the intermediate product (and one or more additional intermediate products, such as the painted sheet 308), the user 128 may access the ERP system 122 to generate a new production model. The user 128 then defines general information, such as a process description and planning procedure (e.g., make-to-stock or make-to-order). The user 128 can further generate a BoM, a BoO, define resources (e.g., machines, tools, and workers), define input and output products, and so forth. In relation to each intermediate product, in some examples, the user 128 defines within the ERP system 122 a first activity that produces the intermediate product and a second activity that consumes the intermediate product. For example, for the cut sheet 304, the user 128 specifies the intermediate product identifier of the cut sheet 304, that the cutting activity 302 produces the cut sheet 304, and that the painting activity 306 consumes the cut sheet 304. The user 128 may also add additional data, such as the quantity of intermediate products per final product (or some other relation between the intermediate products and other items within the production model, depending on the production process).

The ERP system 122 then, at operation 410, integrates the intermediate product into the sequence of activities of the production model, e.g., integrates the cut sheet 304 into the sequence of activities as shown in FIG. 3. The production model is stored in the database 126. Once released or issued, production orders can be issued and executed based on the production model.

At operation 412, the ERP system 122 commences execution of a production order based on the production model. While the production order is in an intermediate state, e.g., before completion thereof, the ERP system 122 tracks state information relating to each intermediate product. For example, the ERP system 122 may automatically inform a worker, e.g., via a notification transmitted to the user device 106, that certain data relating to the cut sheet 304 and the painted sheet 308 must be captured within the ERP system 122 as the production process 300 progresses.

The ERP system 122 is then able to track state information at operation 414, such as movement of each intermediate product from a warehouse to a production area (or other locations of intermediate products), capture batch or serial number information, and track the consumption of each intermediate product. The ERP system 122 may automatically adjust inventory levels to reflect production or consumption of intermediate products. If the master data record of an intermediate product includes a monetary value associated with the intermediate product, the ERP system 122 may also track and dynamically update inventory values associated with intermediate products that exist at a particular point in time.

In some examples, the ERP system 122 may be configured to place certain restrictions on the creation of intermediate products. For example, the ERP system 122 may be configured to only create intermediate products with reference to a specific production order. An intermediate product created in this manner may be created as a variant of a product master, inheriting properties of the product master, such as logistical properties and valuation properties.

Referring back to FIG. 3, as an example, the ERP system 122 may detect completion of a first activity of the production process 300 (cutting activity 302). The ERP system 122 may, for example, detect that a worker has logged or confirmed completion through suitable user input. Responsive to detecting completion of the first activity, the inventory management component 204 of the ERP system 122 automatically adjusts the inventory level of the relevant intermediate product (cut sheet 304) to reflect production of the intermediate product. Similarly, the ERP system 122 may detect completion of a second activity of the production process 300 (painting activity 306). Responsive to detecting completion of the second activity, the inventory management component 204 of the ERP system 122 automatically reduces the inventory level of the cut sheet 304 to reflect consumption of the cut sheet 304 and increases the inventory level of the next intermediate product (painted sheet 308) to reflect its production during the second activity.

At operation 416, the ERP system 122 detects completion of the production order. Given that intermediate products are uniquely identifiable within the ERP system 122, any anomalies or issues relating to intermediate products can be more easily identified, e.g., the ERP system 122 may identify the existence of an "extra" or "spare" intermediate product after the completion of the production order, and then account for that intermediate product, e.g., by reserving it for use in a next production order and including its value in inventory value data. As mentioned above, if the production order is halted in an intermediate state, e.g., due to a machine breakdown or a customer canceling an order, the ERP system 122 enables easy tracking or review of state information relating to any intermediate products that may be present at the time of halting the production order. The method 400 concludes at closing loop element 418.

Referring specifically to monetary values of intermediate products, manufacturing costs may be captured in various ways within an ERP system. For example, the business 134 may configure the ERP system 122 to track the inventory value of an intermediate product by debiting a corresponding manufacturing cost object with the value of the relevant intermediate product when it is put in stock. The analytics and reporting component 216 may generate reports including such inventory values of intermediate products. Alternatively, the business 134 may configure the ERP system 122 to retain manufacturing costs on a production cost object, in which case intermediate products that are put in stock are not valued, or specifically valued at "zero."

Figure 5:
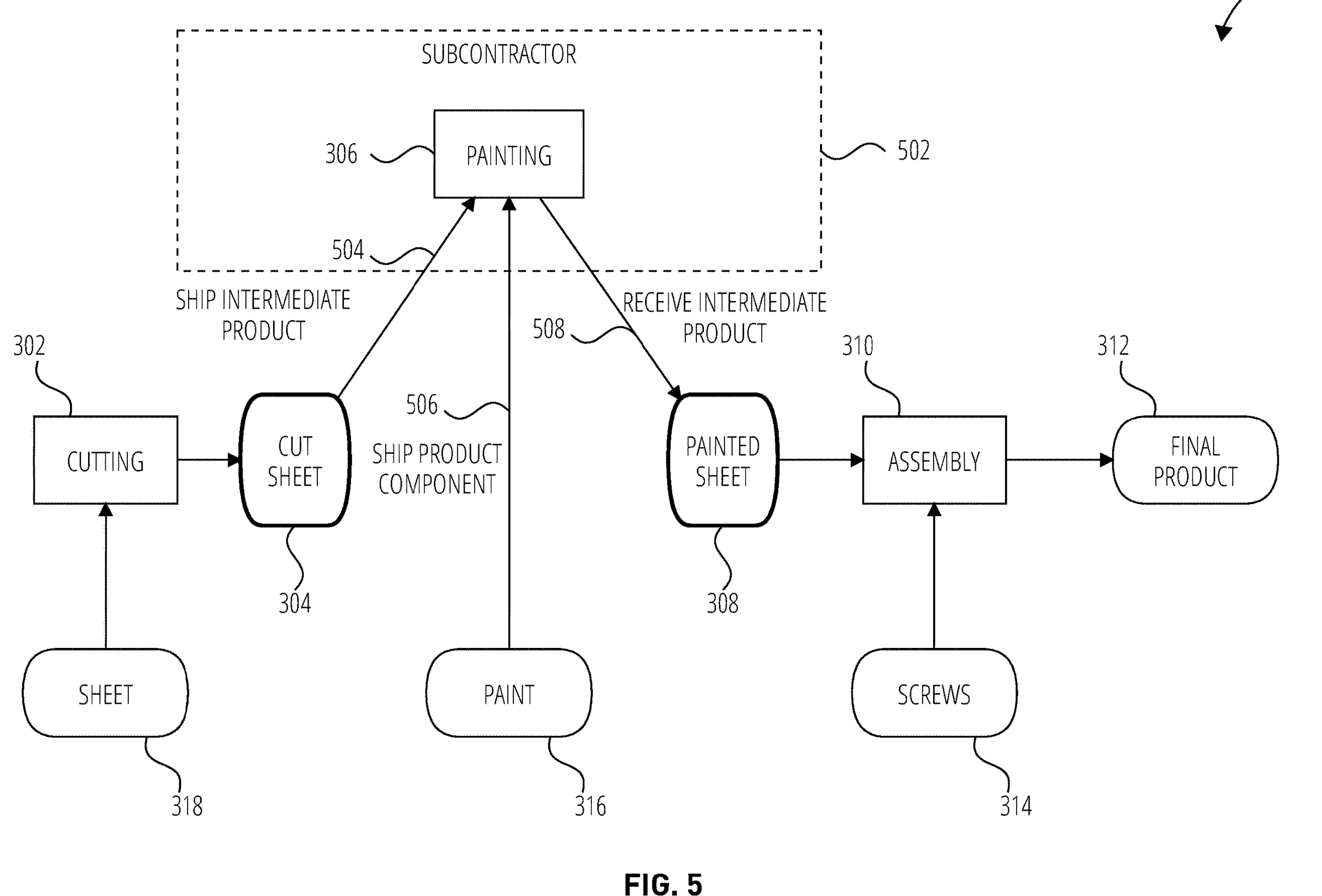
FIG. 5 is a process flow diagram illustrating a sequence of activities of a production process, in which one of the activities is outsourced to a third-party supplier, according to some examples.

FIG. 5 illustrates a production process 500 that is similar to the production process 300 of FIG. 3, with like reference numerals referring to like activities, components, and products. However, in the production process 500 of FIG. 5, one of the activities is outsourced to a subcontractor 502. Specifically, the painting activity 306 of the cut sheet 304 is performed by the subcontractor 502 at an external location, while the other activities in the production process 500 are performed at a primary location of the business 134 associated with the ERP system 122. Accordingly, the activity that is outsourced to the subcontractor 502 is referred to herein as an "external activity," while the other activities are referred to as "internal activities."

In the production process 500, the business 134 procures the product components (the metal sheet 318, paint 316, and screws 314), and performs the cutting activity 302 and the assembly activity 310 (internal activities). The business 134 purchases the painting service (painting activity 306) at the subcontractor 502, and sends the cut sheet 304 and paint 316 to the subcontractor 502 to perform the outsourced (external) activity, as indicated in FIG. 5 by the arrows marked with reference numerals 504 and 506, respectively. Once the subcontractor 502 has completed the activity, the painted sheet 308 is received at the primary location of the business 134, as indicated by the arrow marked with reference numerals 508.

Examples described herein enable the production process 500 to be modeled as a single production process, while also providing transparency with respect to the intermediate products in the production process 500. State information of the intermediate products can be monitored by tracking movement of the intermediate products between the primary location and the external location. For example, since the cut sheet 304 is uniquely identifiable and trackable based on a master data record, it supports warehouse operations and its shipping can be tracked and controlled using the ERP system 122. As another example, since the painted sheet 308 is uniquely identifiable, trackable, and inventory-managed based on its master data record, the painted sheet 308 can be received and stock information can be updated using the ERP system 122 once the painted sheet 308 is received from the subcontractor 502. In the final activity (assembly activity 310), the painted sheet 308 is consumed again and the ERP system 122 is automatically updated accordingly.

The modeling approach as described herein may facilitate the outsourcing of certain activities. For example, this approach may make it easier to send information relating to intermediate products to the subcontractor 502 together with standard order information.

While outsourcing (e.g., subcontracting) is described in some examples of the present disclosure, it is noted that techniques described herein are not limited to outsourcing use cases. For example, the business 134 may wish to inventorize or improve location-tracking (or general logistics handling) of intermediate products even in cases where an entire production process is performed in-house (e.g., at the primary location), to enhance the functionality of the ERP system 122 to cater for situations such as machine breakdowns, labor delays, or other halts in production.

Figure 6:
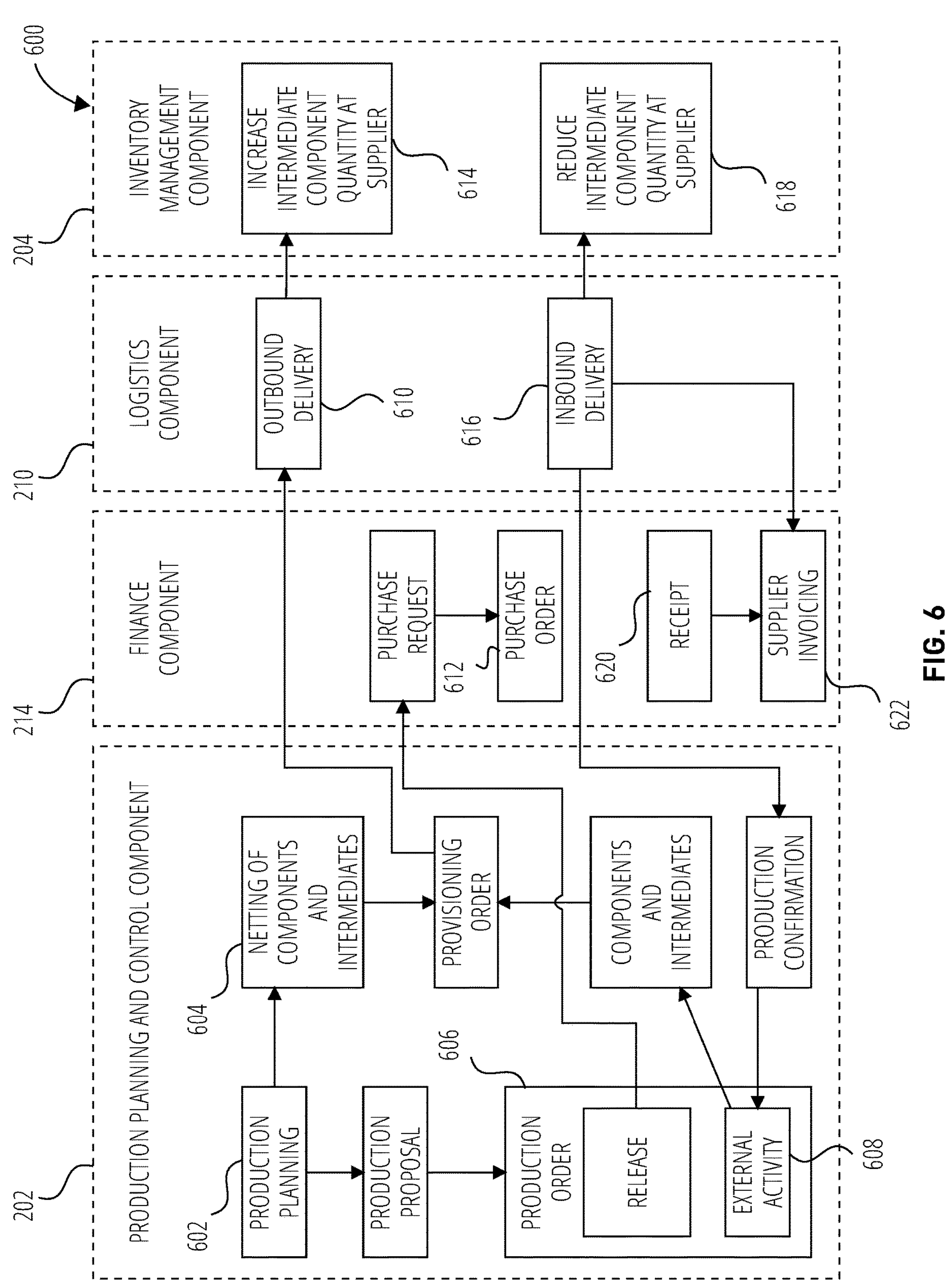
FIG. 6 is a process flow diagram illustrating certain operations that may be performed by components of an ERP system to execute a production order associated with the production process of FIG. 5.

FIG. 6 is a diagram 600 illustrating certain operations that may be performed by components of the ERP system 122 to execute a production order associated with the production process of FIG. 5. FIG. 6 shows operations that may be carried out by or using the production planning and control component 202, the finance component 214, the logistics component 210, and the inventory management component 204 of FIG. 2. For ease of understanding, and to highlight certain aspects of the present disclosure, only some of the operations shown in the diagram 600 are referenced and described below.

During a production planning operation 602, a production model is created by the production planning and control component 202, as described above. The production model defines the cut sheet 304 and the painted sheet 308 as intermediate products, and also defines the activities that produce and consume these intermediate products. As further described below, the cut sheet 304 may be specifically modeled as an intermediate input product of the painting activity, while the painted sheet 308 is specifically modeled as an intermediate output product of the painting activity. Further, the production model is further created so as to model shipment of the cut sheet 304 and the paint 316 and receipt of the painted sheet 308 from the subcontractor 502, with the painting activity 306 being flagged as an external activity.

For example, the BoO may indicate that the painting activity 306 is an external activity and also provide additional procurement information, such as the materials to be procured for shipping to the subcontractor 502. This information is used by the production planning and control component 202 to perform supply planning and netting 604 (e.g., together with the manufacturing component 208).

The production order 606 indicates the details of the external activity 608. When the production order 606 is released, the logistics component 210 automatically initiates outbound delivery 610. The outbound delivery 610 may be executed based on the required product components and intermediate products, as well as supply and demand factors. The inventory management component 204 performs an inventory level adjustment 614 to reflect that the intermediate product has moved to the subcontractor 502.

Release of the production order 606 may also automatically trigger the finance component 214 to commence a purchasing process, e.g., generating a purchase order 612 for the job to be performed by the subcontractor 502. Once the goods are returned from the subcontractor 502 in an inbound delivery 616, the inventory management component 204 performs a further inventory level adjustment 618 to reflect reduction in intermediate product quantity at the supplier, and also to reflect production of a new intermediate product, e.g., the painted sheet 308.

Based on a receipt 620, the finance component 214 may automatically initiate supplier invoicing 622. Given that the intermediate products are uniquely identifiable via the intermediate product indicators in their master data records, the financial accounting features of the finance component 214 allow for transparency with respect to intermediate products to be included in outsourcing (e.g., subcontracting) costs.

FIG. 7 to FIG. 10 are user interface diagrams illustrating examples of a graphical user interface (GUI) 702 of the ERP system 122, according to some examples. The GUI 702 may, for example, be presented to the user 128 on a display of the user device 106. The user 128 may use the user device 106 to interact with the ERP system 122 via the GUI 702.

Figure 7:
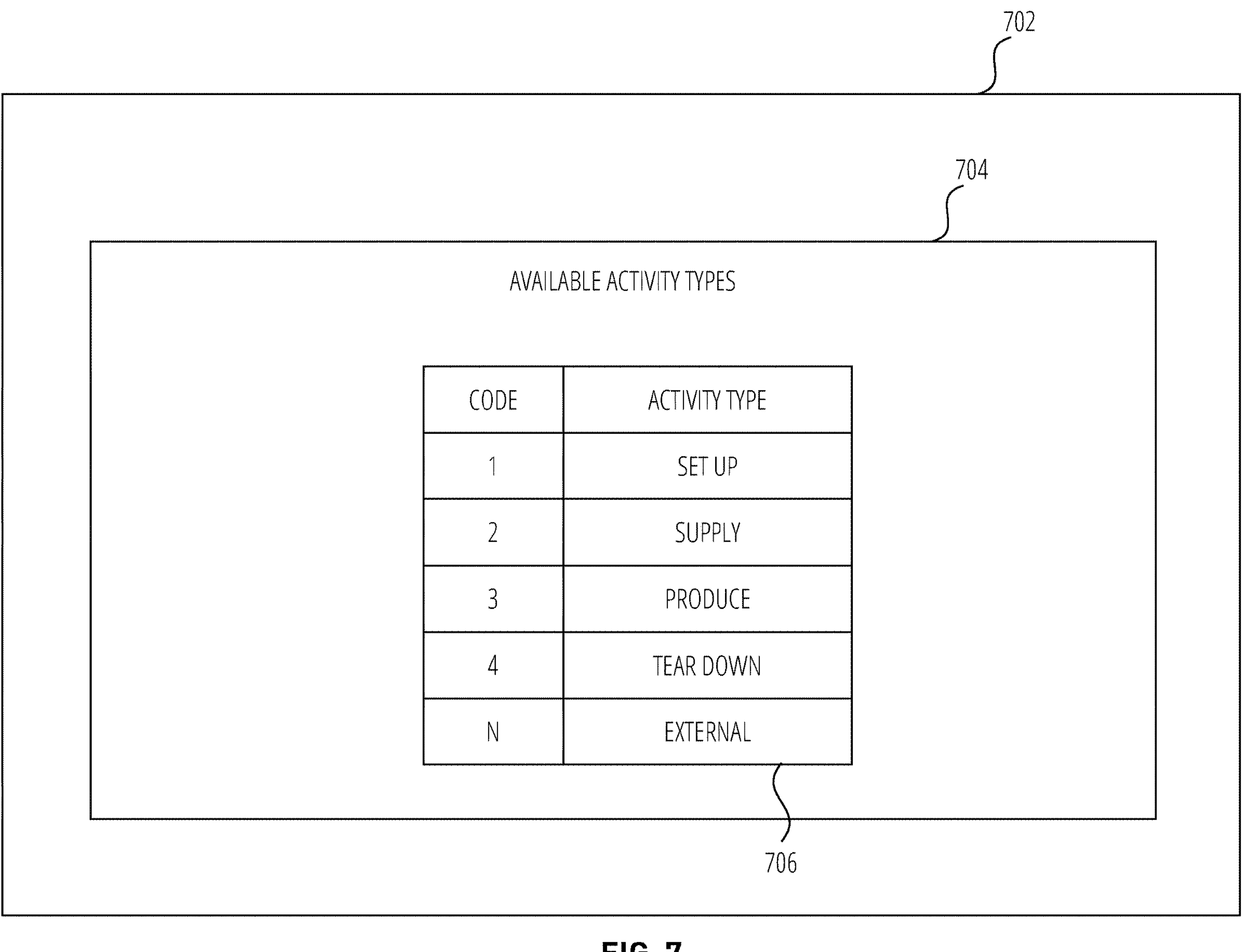
FIG. 7 is a user interface diagram illustrating a graphical user interface (GUI) of an ERP system, according to some examples, in which a list of available activity types is shown.

Referring firstly to FIG. 7, a GUI 702 illustrates an example set of available activity types 704. During creation of a production model, the user 128 can select from one of the available activity types 704. One of the available activity types 704 is an external activity type 706, allowing the user 128 to identify an activity as an external activity.

Activity types may be utilized to link different external services, e.g., subcontracted activities, in master resource data. Accordingly, the same resource may be used to link different BoO to different services. In some examples, the ERP system 122 enables fine-tuning of activity types or enables users to create their own activity types, thereby to enhance the flexibility or customization of the ERP system 122.

Figure 8:
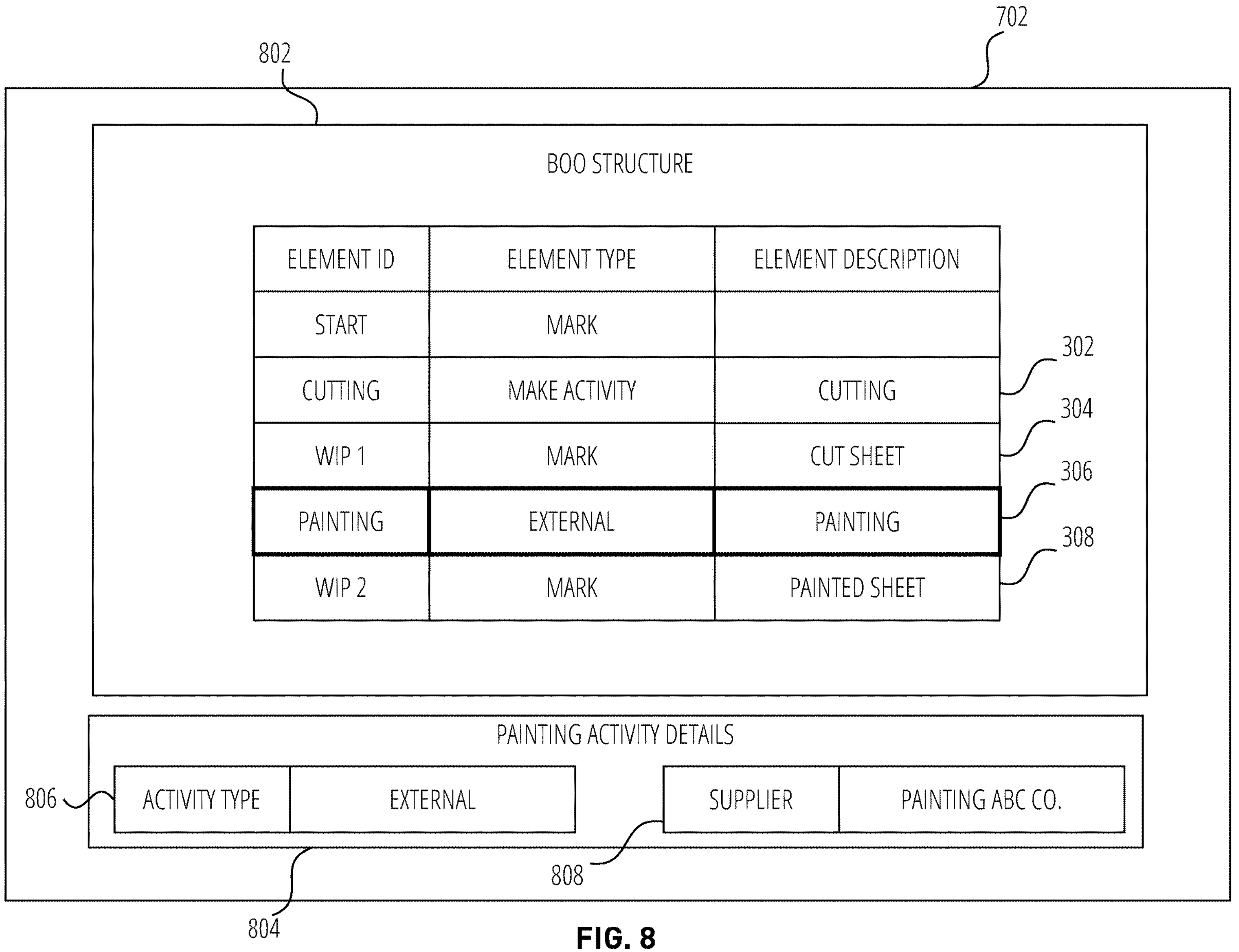
FIG. 8 is a user interface diagram illustrating a GUI of an ERP system, according to some examples, in which aspects of a Bill of Operations (BoO) structure are shown.

Turning to FIG. 8, the GUI 702 is shown to present a BoO structure 802. The user 128 may provide suitable user input to create or adjust the BoO structure 802. Merely as an example, FIG. 8 shows the following activities and intermediate products from FIG. 3 and FIG. 5: the cutting activity 302, the cut sheet 304, the painting activity 306, and the painted sheet 308.

In FIG. 8, the painting activity 306 of the cut sheet 304 is specifically marked as an external activity. As shown in FIG. 8, in response to the user 128 selecting the external activity within the BoO structure 802, the GUI 702 presents painting activity details 804, including the activity type 806 ("external") and a supplier identifier 808. The supplier identifier 808 in FIG. 8 is the name of the subcontractor 502 ("Painting ABC Co.").

Based on the BoO structure 802, the ERP system 122 is able to determine, for example, how many intermediate products need to be shipped to the subcontractor 502 for each production order, and can ensure supply chain consistency, e.g., by adjusting available quantity correctly when confirming the external activity during production order execution.

Figure 9:
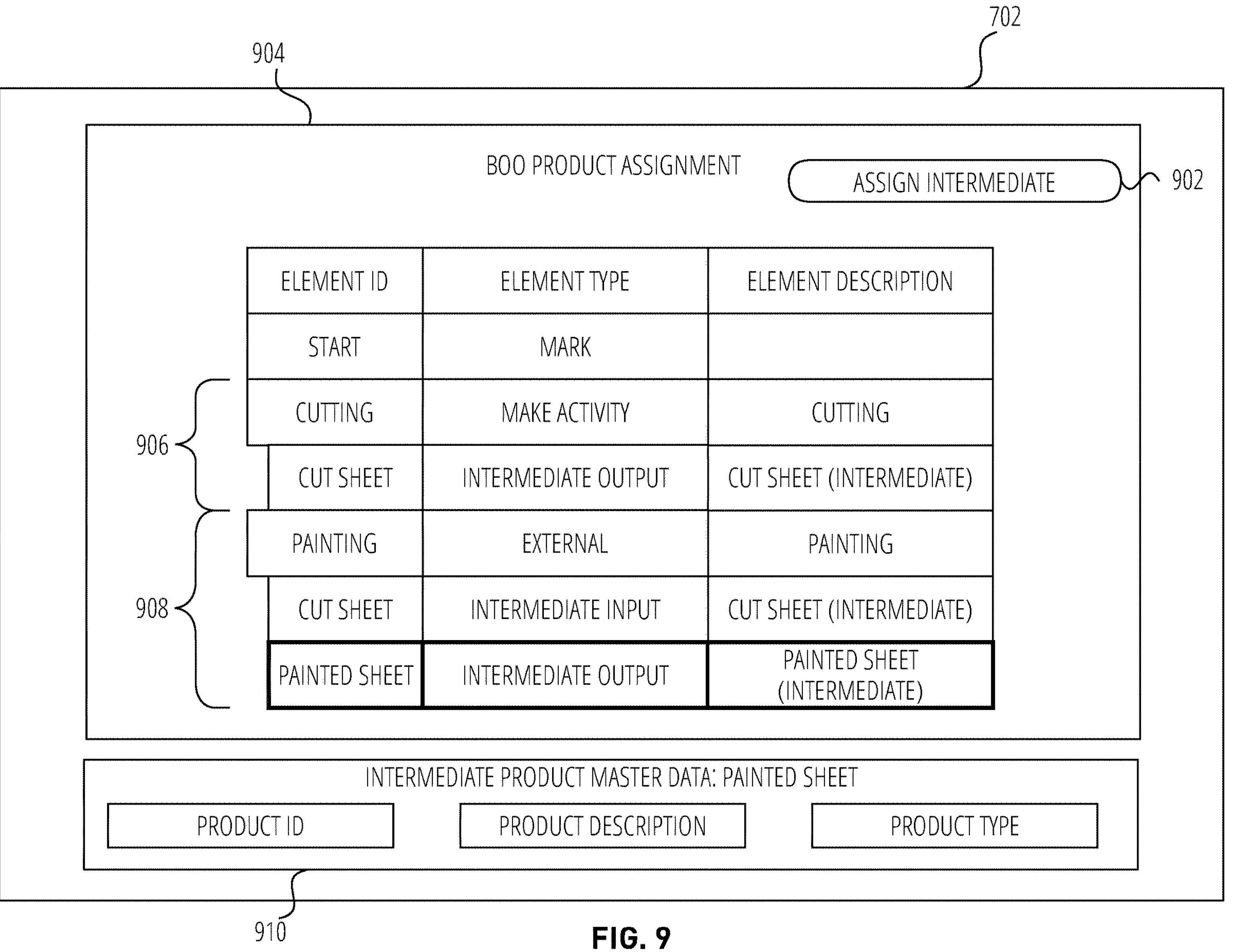
FIG. 9 is a user interface diagram illustrating a GUI of an ERP system, according to some examples, showing aspects of product assignment in the context of a production model.

Referring now to FIG. 9, the GUI 702 is shown to present a BoO product assignment window 904. To support, for example, logistics handling of an intermediate product, the user 128 may utilize the BoO product assignment window 904 to assign an intermediate product to a specific activity. The BoO product assignment window 904 presents an intermediate assignment button 902 that can be selected by the user 128 to perform assignments, and may also include an "unassign" button (not shown) should the user 128 wish to reverse an assignment.

The BoO product assignment window 904 enables the user 128 to assign one or more intermediate products to the same or different activities. In some examples, the ERP system 122 restricts the user 128 to selecting only one intermediate output for an external activity to ensure a clear one-to-one relationship between a reporting point quantity and a recorded quantity in an inbound delivery process.

Still referring to FIG. 9, the BoO product assignment window 904 displays cutting activity details 906 and painting activity details 908, corresponding to the elements shown in FIG. 5 (in which painting is an external activity). The cutting activity details 906 show that the cut sheet 304 is selected as an "intermediate output" of the cutting activity 302, and the painting activity details 908 show that the cut sheet 304 is selected as an "intermediate input" of the painting activity 306. Further, the painted sheet 308 is selected as an "intermediate output" of the painting activity 306. Modeling of intermediate products in this manner may be effected by linking the product identifier of the relevant intermediate product to the corresponding activity, and specifying the input/output details.

The user 128 may select a particular element in the BoO product assignment window 904 to view or modify details thereof. For example, and as shown in FIG. 9, the user 128 may select the painted sheet, which causes presentation of intermediate product master data 910 for the painted sheet. The intermediate product master data 910 may include one or more data points of the master data record of the painted sheet, e.g., "product identifier (ID)," "product description," and "product type," as shown in FIG. 9.

Figure 10:
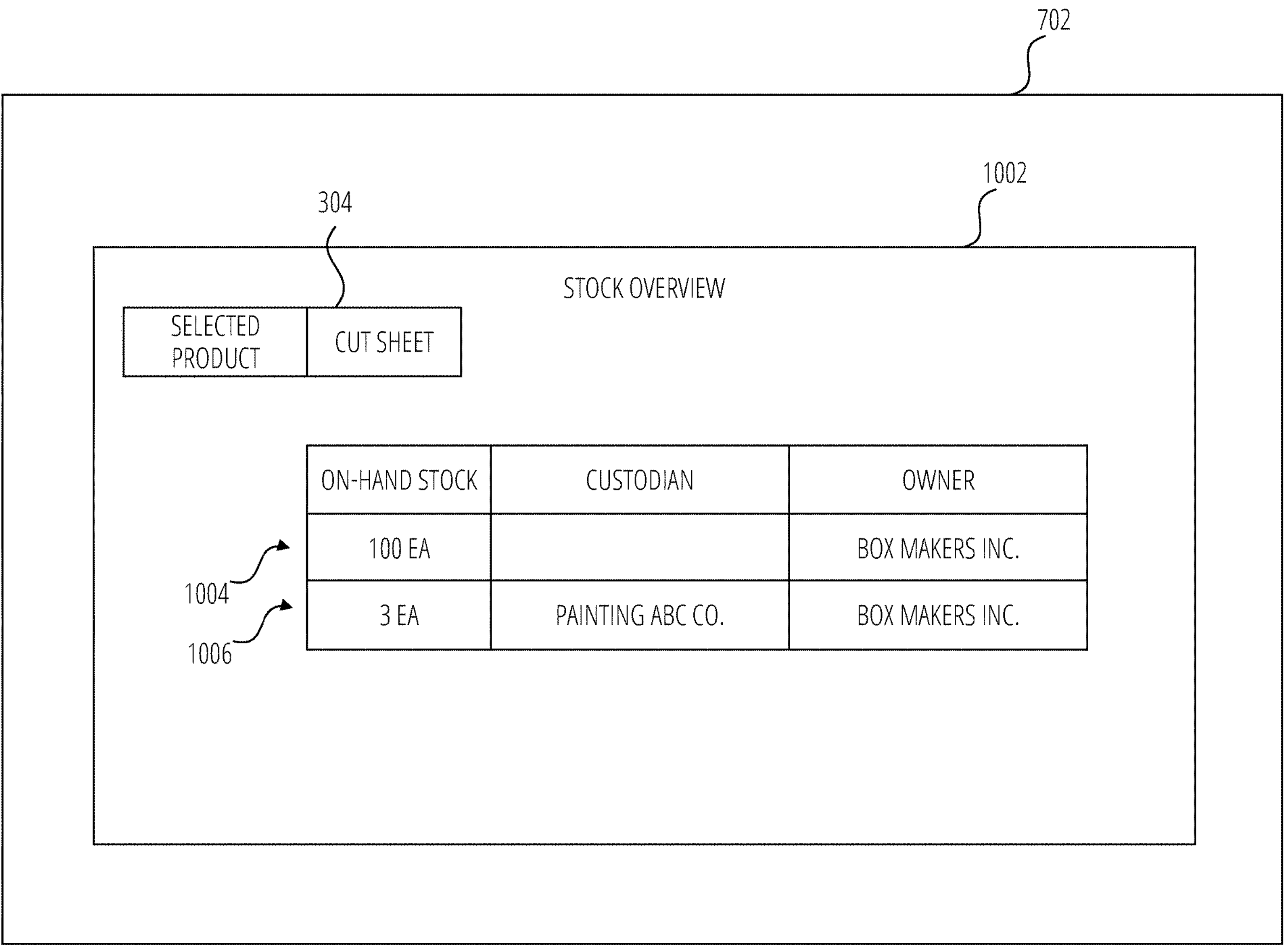
FIG. 10 is a user interface diagram illustrating a GUI of an ERP system, according to some examples, in which an inventory tracking feature is shown.

In FIG. 10, the GUI 702 shows an inventory tracking feature of the ERP system 122. The inventory tracking feature is provided to the user 128 by presenting a stock overview window 1002. As an example, FIG. 10 shows a stock overview for the cut sheet 304 of FIG. 5 which is, as described above, an intermediate product in the example metal box manufacturing process.

Given that state information of the cut sheet 304 can be tracked using the ERP system 122, the user 128 is able to view inventory of the cut sheet 304, as well as the location of inventory, via the ERP system 122. In the example of FIG. 10, the stock overview window 1002 shows internally located intermediate product stock 1004 and externally located intermediate product stock 1006. In other words, the stock overview window 1002 shows that some stock is located at the primary location of the business 134 ("Box Makers Inc."), while the remainder of the stock is located at the external location of the subcontractor 502 ("Painting ABC Co.").

In some examples, the ERP system 122 is configured to identify and track inventory at external locations by recording one or more of the following data: the planning or production area the intermediate product was sent from, custodian (supplier) identifier, custodian (supplier) description, product identifier of the intermediate product, confirmations or notifications received from the custodian (supplier), serial numbers or other stock identifiers, receipts, and product specifications.

It will be appreciated that the GUI 702 is shown in simplified form in FIG. 7 to FIG. 10 to illustrate certain aspects of the abovementioned examples. In other examples, a GUI of the ERP system 122 may include a variety of elements, formats, or layouts for providing or facilitating one or more other features of the ERP system 122.

In view of the above-described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a system comprising: at least one memory that stores instructions; and one or more processors configured by the instructions to perform operations comprising: receiving user input to define an intermediate product; responsive to receiving the user input to define the intermediate product, generating, within an enterprise resource planning (ERP) system, a master data record for the intermediate product; receiving user input to include, the intermediate product in a production model within the ERP system that is associated with a real-world production process; responsive to receiving the user input to include the intermediate product in the production model, updating the production model based on the master data record to integrate the intermediate product into a sequence of activities, wherein the sequence of activities comprises a first activity that produces the intermediate product and a second activity that consumes the intermediate product; and executing a production order based on the production model, wherein execution of the production order comprises tracking, within the ERP system, state information of the intermediate product.

In Example 2, the subject matter of Example 1 includes, wherein the state information of the intermediate product comprises at least one of: an inventory level of the intermediate product; an inventory value of the intermediate product; a location of one or more units of the intermediate product; a location of a quantity of the intermediate product; batch information; or serial number information.

In Example 3, the subject matter of Example 2 includes, wherein tracking the state information of the intermediate product comprises: detecting completion of the first activity; and responsive to detecting completion of the first activity, automatically adjusting the inventory level of the intermediate product within the ERP system to reflect production of the intermediate product.

In Example 4, the subject matter of Examples 2-3 includes, wherein tracking the state information of the intermediate product comprises: detecting completion of the second activity; and responsive to detecting completion of the second activity, automatically adjusting the inventory level of the intermediate product within the ERP system to reflect consumption of the intermediate product.

In Example 5, the subject matter of Examples 2-4 includes, the operations further comprising: receiving user input to classify the second activity as an external activity.

In Example 6, the subject matter of Example 5 includes, wherein the first activity is an internal activity performed at a primary location, wherein the second activity is performed at an external location, and wherein tracking the state information of the intermediate product comprises tracking movement of the intermediate product from the primary location to the external location.

In Example 7, the subject matter of Examples 5-6 includes, wherein the external activity is performed by a third-party supplier identified within the ERP system.

In Example 8, the subject matter of Examples 1-7 includes, wherein the master data record for the intermediate product comprises an intermediate product indicator that distinguishes the intermediate product from a final product defined in the production model.

In Example 9, the subject matter of Example 8 includes, wherein the master data record defines a quantity of the intermediate product per final product.

In Example 10, the subject matter of Examples 1-9 includes, wherein the master data record for the intermediate product comprises an intermediate product indicator that distinguishes the intermediate product from one or more product components defined in the production model.

In Example 11, the subject matter of Examples 1-10 includes, wherein the user input to include the intermediate product in the production model comprises a selection of the intermediate product as an output of the first activity and as an input to the second activity.

In Example 12, the subject matter of Examples 1-11 includes, wherein the sequence of activities forms part of a Bill of Operations (BoO) of the production model within the ERP system.

In Example 13, the subject matter of Examples 1-12 includes, wherein execution of the production order comprises: detecting that the production order is in an intermediate state; and tracking the state information of the intermediate product within the ERP system while the production order remains in the intermediate state.

In Example 14, the subject matter of Examples 1-13 includes, wherein the user input to define the intermediate product and to include the intermediate product in the production model are received via a graphical user interface (GUI) of the ERP system, the operations further comprising: causing presentation, at a user device and via the GUI of the ERP system, of the state information of the intermediate product.

Example 15 is a method comprising: receiving user input to define an intermediate product; responsive to receiving the user input to define the intermediate product, generating, within an enterprise resource planning (ERP) system, a master data record for the intermediate product; receiving user input to include, the intermediate product in a production model within the ERP system that is associated with a real-world production process; responsive to receiving the user input to include the intermediate product in the production model, updating the production model based on the master data record to integrate the intermediate product into a sequence of activities, wherein the sequence of activities comprises a first activity that produces the intermediate product and a second activity that consumes the intermediate product; and executing a production order based on the production model, wherein execution of the production order comprises tracking, within the ERP system, state information of the intermediate product.

In Example 16, the subject matter of Example 15 includes, wherein the state information of the intermediate product comprises at least one of: an inventory level of intermediate product; a location of one or more units of the intermediate product; a location of a quantity of the intermediate product; batch information; or serial number information.

In Example 17, the subject matter of Example 16 includes, wherein tracking the state information of the intermediate product comprises: detecting completion of the first activity; and responsive to detecting completion of the first activity, automatically adjusting the inventory level of the intermediate product within the ERP system to reflect production of the intermediate product.

Example 18 is a non-transitory computer-readable medium that stores instructions that, when executed by one or more processors, cause the one or more processors to perform operations comprising: receiving user input to define an intermediate product; responsive to receiving the user input to define the intermediate product, generating, within an enterprise resource planning (ERP) system, a master data record for the intermediate product; receiving user input to include, the intermediate product in a production model within the ERP system that is associated with a real-world production process; responsive to receiving the user input to include the intermediate product in the production model, updating the production model based on the master data record to integrate the intermediate product into a sequence of activities, wherein the sequence of activities comprises a first activity that produces the intermediate product and a second activity that consumes the intermediate product; and executing a production order based on the production model, wherein execution of the production order comprises tracking, within the ERP system, state information of the intermediate product.

In Example 19, the subject matter of Example 18 includes, wherein the state information of the intermediate product comprises at least one of: an inventory level of intermediate product; a location of one or more units of the intermediate product; a location of a quantity of the intermediate product; batch information; or serial number information.

In Example 20, the subject matter of Example 19 includes, wherein tracking the state information of the intermediate product comprises: detecting completion of the first activity; and responsive to detecting completion of the first activity, automatically adjusting the inventory level of the intermediate product within the ERP system to reflect production of the intermediate product.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

Figure 11:
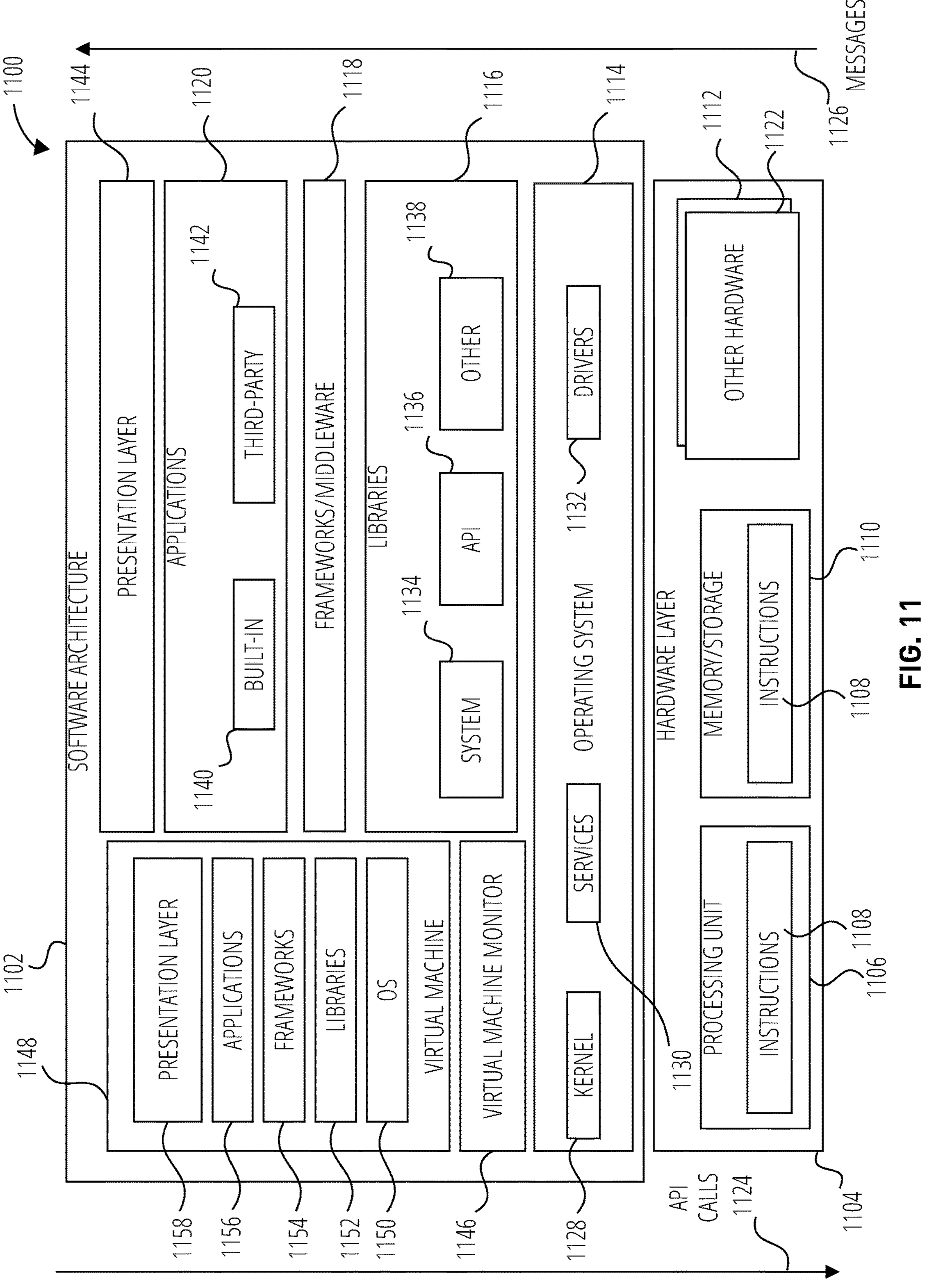
FIG. 11 is a block diagram showing a software architecture for a computing device, according to some examples.

FIG. 11 is a block diagram 1100 showing a software architecture 1102 for a computing device, according to some examples. The software architecture 1102 may be used in conjunction with various hardware architectures, for example, as described herein. FIG. 11 is merely a non-limiting illustration of a software architecture, and many other architectures may be implemented to facilitate the functionality described herein. A representative hardware layer 1104 is illustrated and can represent, for example, any of the above referenced computing devices. In some examples, the hardware layer 1104 may be implemented according to the architecture of the computer system of FIG. 12.

The representative hardware layer 1104 comprises one or more processing units 1106 having associated executable instructions 1108. Executable instructions 1108 represent the executable instructions of the software architecture 1102, including implementation of the methods, modules, subsystems, and components, and so forth described herein and may also include memory and/or storage modules 1110, which also have executable instructions 1108. Hardware layer 1104 may also comprise other hardware as indicated by other hardware 1112 and other hardware 1122 which represent any other hardware of the hardware layer 1104, such as the other hardware illustrated as part of the software architecture 1102.

In the architecture of FIG. 11, the software architecture 1102 may be conceptualized as a stack of layers where each layer provides particular functionality. For example, the software architecture 1102 may include layers such as an operating system 1114, libraries 1116, frameworks/middleware layer 1118, applications 1120, and presentation layer 1144. Operationally, the applications 1120 or other components within the layers may invoke API calls 1124 through the software stack and access a response, returned values, and so forth illustrated as messages 1126 in response to the API calls 1124. The layers illustrated are representative in nature and not all software architectures have all layers. For example, some mobile or special purpose operating systems may not provide a frameworks/middleware layer 1118, while others may provide such a layer. Other software architectures may include additional or different layers.

The operating system 1114 may manage hardware resources and provide common services. The operating system 1114 may include, for example, a kernel 1128, services 1130, and drivers 1132. The kernel 1128 may act as an abstraction layer between the hardware and the other software layers. For example, the kernel 1128 may be responsible for memory management, processor management (e.g., scheduling), component management, networking, security settings, and so on. The services 1130 may provide other common services for the other software layers. In some examples, the services 1130 include an interrupt service. The interrupt service may detect the receipt of an interrupt and, in response, cause the software architecture 1102 to pause its current processing and execute an interrupt service routine (ISR) when an interrupt is accessed.

The drivers 1132 may be responsible for controlling or interfacing with the underlying hardware. For instance, the drivers 1132 may include display drivers, camera drivers, Bluetooth® drivers, flash memory drivers, serial communication drivers (e.g., Universal Serial Bus (USB) drivers), Wi-Fi® drivers, near-field communication (NFC) drivers, audio drivers, power management drivers, and so forth depending on the hardware configuration.

The libraries 1116 may provide a common infrastructure that may be utilized by the applications 1120 or other components or layers. The libraries 1116 typically provide functionality that allows other software modules to perform tasks in an easier fashion than to interface directly with the underlying operating system 1114 functionality (e.g., kernel 1128, services 1130 or drivers 1132). The libraries 1116 may include system libraries 1134 (e.g., C standard library) that may provide functions such as memory allocation functions, string manipulation functions, mathematic functions, and the like. In addition, the libraries 1116 may include API libraries 1136 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 1116 may also include a wide variety of other libraries 1138 to provide many other APIs to the applications 1120 and other software components/modules.

The frameworks/middleware layer 1118 may provide a higher-level common infrastructure that may be utilized by the applications 1120 or other software components/modules. For example, the frameworks/middleware layer 1118 may provide various graphic user interface (GUI) functions, high-level resource management, high-level location services, and so forth. The frameworks/middleware layer 1118 may provide a broad spectrum of other APIs that may be utilized by the applications 1120 or other software components/modules, some of which may be specific to a particular operating system or platform.

The applications 1120 include built-in applications 1140 or third-party applications 1142. Examples of representative built-in applications 1140 may include, but are not limited to, a contacts application, a browser application, a book reader application, a location application, a media application, a messaging application, or a game application. Third-party applications 1142 may include any of the built-in applications as well as a broad assortment of other applications. In a specific example, the third-party application 1142 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 1142 may invoke the API calls 1124 provided by the mobile operating system such as operating system 1114 to facilitate functionality described herein.

The applications 1120 may utilize built in operating system functions (e.g., kernel 1128, services 1130 or drivers 1132), libraries (e.g., system libraries 1134, API libraries 1136, and other libraries 1138), and frameworks/middleware layer 1118 to create user interfaces to interact with users of the system. Alternatively, or additionally, in some systems, interactions with a user may occur through a presentation layer, such as presentation layer 1144. In these systems, the application/module "logic" can be separated from the aspects of the application/module that interact with a user.

Some software architectures utilize virtual machines. In the example of FIG. 11, this is illustrated by virtual machine 1148. A virtual machine creates a software environment where applications/modules can execute as if they were executing on a hardware computing device. A virtual machine is hosted by a host operating system (operating system 1114) and typically, although not always, has a virtual machine monitor 1146, which manages the operation of the virtual machine as well as the interface with the host operating system (e.g., operating system 1114). A software architecture executes within the virtual machine 1148 such as an operating system 1150, libraries 1152, frameworks/middleware 1154, applications 1156 or presentation layer 1158. These layers of software architecture executing within the virtual machine 1148 can be the same as corresponding layers previously described or may be different.

Certain examples are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In examples, one or more computer systems (e.g., a standalone, client, or server computer system) or one or more hardware processors may be configured by software (e.g., an application or application portion) as a hardware-implemented module that operates to perform certain operations as described herein.

In various examples, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner or to perform certain operations described herein. Considering examples in which hardware-implemented modules are temporarily configured (e.g., programmed), each of the hardware-implemented modules need not be configured or instantiated at any one instance in time. For example, where the hardware-implemented modules comprise, a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In examples in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some examples, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some examples, the processor or processors may be located in a single location (e.g., within a home environment, an office environment, or a server farm), while in other examples the processors may be distributed across a number of locations.

The one or more processors may also operate to support performance of the relevant operations in a "cloud computing" environment or as a "software as a service (SaaS)." For example, at least some of the operations may be performed by a group of computers (as examples of machines including processors), these operations being accessible via a network (e.g., the Internet) and via one or more appropriate interfaces (e.g., APIs).

Examples may be implemented in digital electronic circuitry, or in computer hardware, firmware, or software, or in combinations of them. Examples may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In examples, operations may be performed by one or more programmable processors executing a computer program to perform functions by operating on input data and generating output. Method operations can also be performed by, and apparatus of some examples may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In examples deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various examples.

Figure 12:
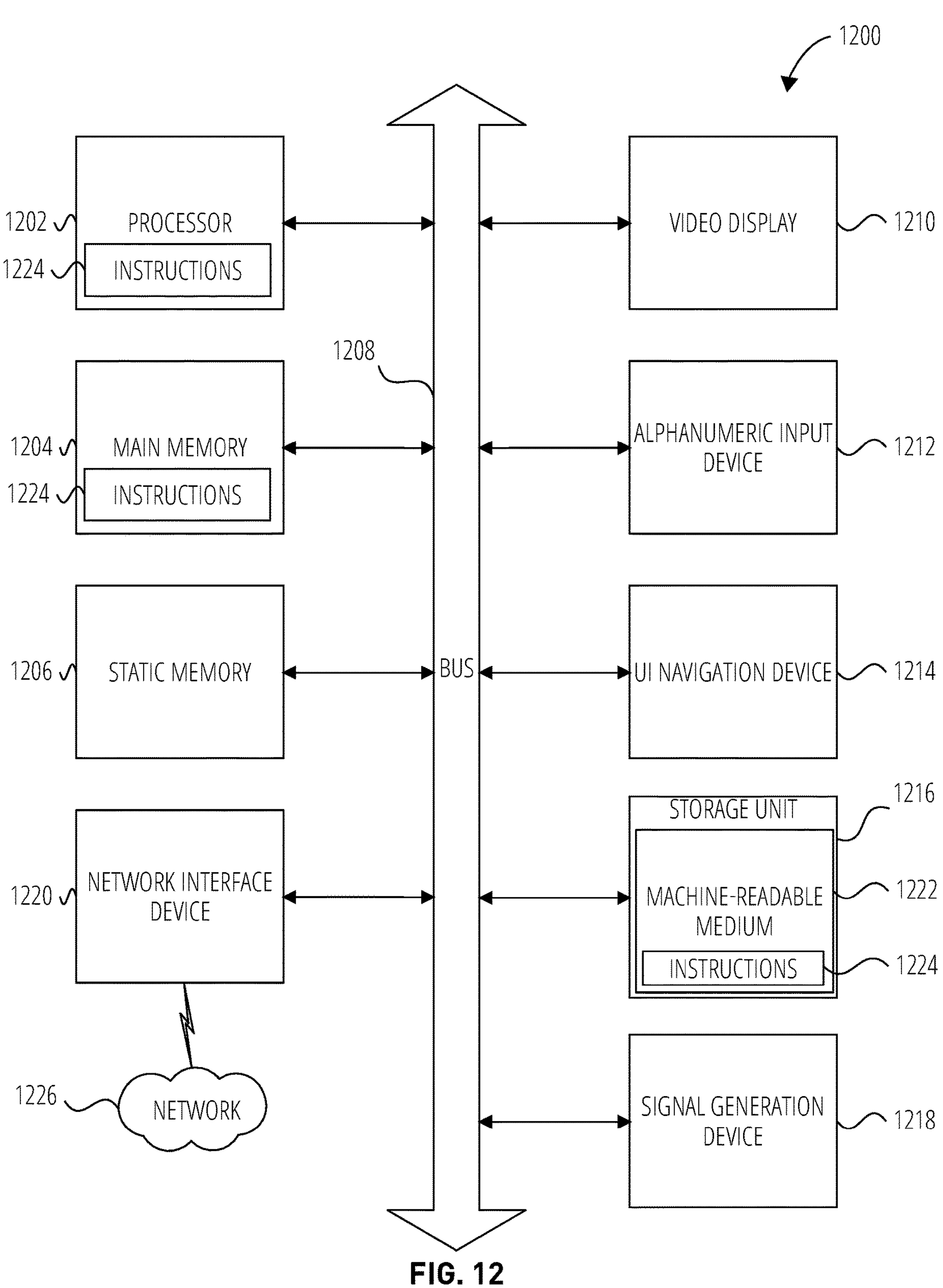
FIG. 12 is a block diagram of a machine in the form of a computer system, according to some examples, within which instructions may be executed for causing the machine to perform any one or more of the methodologies discussed herein.

FIG. 12 is a block diagram of a machine in the example form of a computer system 1200 within which instructions 1224 may be executed for causing the machine to perform any one or more of the methodologies discussed herein. In alternative examples, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU), a GPU, or both), a primary or main memory 1204, and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alphanumeric input device 1212 (e.g., a keyboard or a touch-sensitive display screen), a UI navigation (or cursor control) device 1214 (e.g., a mouse), a storage unit 1216, a signal generation device 1218 (e.g., a speaker), and a network interface device 1220.

The storage unit 1216 includes a machine-readable medium 1222 on which is stored one or more sets of data structures and instructions 1224 (e.g., software) embodying or utilized by any one or more of the methodologies or functions described herein. The instructions 1224 may also reside, completely or at least partially, within the main memory 1204 or within the processor 1202 during execution thereof by the computer system 1200, with the main memory 1204 and the processor 1202 also each constituting a machine-readable medium 1222.

While the machine-readable medium 1222 is shown in accordance with some examples to be a single medium, the term "machine-readable medium" may include a single medium or multiple media (e.g., a centralized or distributed database, or associated caches and servers) that store the one or more instructions 1224 or data structures. The term "machine-readable medium" shall also be taken to include any tangible medium that is capable of storing, encoding, or carrying instructions 1224 for execution by the machine and that cause the machine to perform any one or more of the methodologies of the present disclosure, or that is capable of storing, encoding, or carrying data structures utilized by or associated with such instructions 1224. The term "machine-readable medium" shall accordingly be taken to include, but not be limited to, solid-state memories, and optical and magnetic media. Specific examples of a machine-readable medium 1222 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and compact disc read-only memory (CD-ROM) and digital versatile disc read-only memory (DVD-ROM) disks. A machine-readable medium is not a transmission medium.

The instructions 1224 may further be transmitted or received over a communications network 1226 using a transmission medium. The instructions 1224 may be transmitted using the network interface device 1220 and any one of a number of well-known transfer protocols (e.g., hypertext transport protocol (HTTP)). Examples of communication networks include a local area network (LAN), a wide area network (WAN), the Internet, mobile telephone networks, plain old telephone (POTS) networks, and wireless data networks (e.g., Wi-Fi and Wi-Max networks). The term "transmission medium" shall be taken to include any intangible medium that is capable of storing, encoding, or carrying instructions 1224 for execution by the machine, and includes digital or analog communications signals or other intangible media to facilitate communication of such software.

Although specific examples are described herein, it will be evident that various modifications and changes may be made to these examples without departing from the broader spirit and scope of the disclosure. Accordingly, the specification and drawings are to be regarded in an illustrative rather than a restrictive sense. The accompanying drawings that form a part hereof show by way of illustration, and not of limitation, specific examples in which the subject matter may be practiced. The examples illustrated are described in sufficient detail to enable those skilled in the art to practice the teachings disclosed herein. Other examples may be utilized and derived therefrom, such that structural and logical substitutions and changes may be made without departing from the scope of this disclosure. This detailed description, therefore, is not to be taken in a limiting sense, and the scope of various examples is defined only by the appended claims, along with the full range of equivalents to which such claims are entitled.

Such examples of the inventive subject matter may be referred to herein, individually or collectively, by the "example" merely for convenience and without intending to voluntarily limit the scope of this application to any single example or concept if more than one is in fact disclosed. Thus, although specific examples have been illustrated and described herein, it should be appreciated that any arrangement calculated to achieve the same purpose may be substituted for the specific examples shown. This disclosure is intended to cover any and all adaptations or variations of various examples. Combinations of the above examples, and other examples not specifically described herein, will be apparent to those of skill in the art upon reviewing the above description.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" and "an" are herein used, as is common in patent documents, to include one or more than one instance. Finally, as used herein, the conjunction "or" refers to a non-exclusive "or," unless specifically stated otherwise.

Unless the context clearly requires otherwise, throughout the description and the claims, the words "comprise," "comprising," and the like are to be construed in an inclusive sense, as opposed to an exclusive or exhaustive sense, e.g., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number, respectively. The word "or" in reference to a list of two or more items, covers all of the following interpretations of the word: any one of the items in the list, all of the items in the list, and any combination of the items in the list.

Although some examples, e.g., those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence.

What is claimed is:

1. A system comprising:
- at least one memory that stores instructions; and
- one or more processors configured by the instructions to perform operations comprising:
  - creating a production model within an enterprise resource planning (ERP) system, the production model representing a real-world process by relating a set of product components, a sequence of activities comprising a first activity and a second activity, and a final product to each other, without defining any intermediate products;
  - receiving user input to define an intermediate product;
  - responsive to receiving the user input to define the intermediate product, generating, within the ERP system, a master data record for the intermediate product;
  - receiving user input to include the intermediate product in the production model;

in response to receiving the user input to include the intermediate product in the production model, updating the production model based on the master data record to integrate the intermediate product into the sequence of activities, wherein the first activity produces the intermediate product and the second activity consumes the intermediate product; and executing a production order based on the production model, wherein execution of the production order comprises tracking, within the ERP system, state information of the intermediate product.

2. The system of claim 1, wherein the state information of the intermediate product comprises at least one of: an inventory level of the intermediate product; an inventory value of the intermediate product; a location of one or more units of the intermediate product; a location of a quantity of the intermediate product; batch information; or serial number information.

3. The system of claim 2, wherein tracking the state information of the intermediate product comprises:

detecting completion of the first activity; and responsive to detecting completion of the first activity, automatically adjusting the inventory level of the intermediate product within the ERP system to reflect production of the intermediate product.

4. The system of claim 2, wherein tracking the state information of the intermediate product comprises:

detecting completion of the second activity; and responsive to detecting completion of the second activity, automatically adjusting the inventory level of the intermediate product within the ERP system to reflect consumption of the intermediate product.

5. The system of claim 2, the operations further comprising:

receiving user input to classify the second activity as an external activity.

6. The system of claim 5, wherein the first activity is an internal activity performed at a primary location, wherein the second activity is performed at an external location, and wherein tracking the state information of the intermediate product comprises tracking movement of the intermediate product from the primary location to the external location.

7. The system of claim 5, wherein the external activity is performed by a third-party supplier identified within the ERP system.

8. The system of claim 1, wherein the master data record for the intermediate product comprises an intermediate product indicator that distinguishes the intermediate product from a final product defined in the production model.

9. The system of claim 8, wherein the master data record defines a quantity of the intermediate product per final product.

10. The system of claim 1, wherein the master data record for the intermediate product comprises an intermediate product indicator that distinguishes the intermediate product from one or more product components defined in the production model.

11. The system of claim 1, wherein the user input to include the intermediate product in the production model comprises a selection of the intermediate product as an output of the first activity and as an input to the second activity.

12. The system of claim 1, wherein the sequence of activities forms part of a Bill of Operations (BoO) of the production model within the ERP system.

13. The system of claim 1, wherein execution of the production order comprises:

detecting that the production order is in an intermediate state; and tracking the state information of the intermediate product within the ERP system while the production order remains in the intermediate state.

14. The system of claim 1, wherein the user input to define the intermediate product and to include the intermediate product in the production model are received via a graphical user interface (GUI) of the ERP system, the operations further comprising:

causing presentation, at a user device and via the GUI of the ERP system, of the state information of the intermediate product.

15. A method comprising:

creating a production model within an enterprise resource planning (ERP) system, the production model representing a real-world process by relating a set of product components, a sequence of activities comprising a first activity and a second activity, and a final product to each other, without defining any intermediate products;

receiving user input to define an intermediate product;

responsive to receiving the user input to define the intermediate product, generating, within the ERP system, a master data record for the intermediate product;

receiving user input to include the intermediate product in the production model;

in response to receiving the user input to include the intermediate product in the production model, updating the production model based on the master data record to integrate the intermediate product into the sequence of activities, wherein the first activity produces the intermediate product and the second activity consumes the intermediate product; and executing a production order based on the production model, wherein execution of the production order comprises tracking, within the ERP system, state information of the intermediate product.

16. The method of claim 15, wherein the state information of the intermediate product comprises at least one of: an inventory level of the intermediate product; a location of one or more units of the intermediate product; a location of a quantity of the intermediate product; batch information; or serial number information.

17. The method of claim 16, wherein tracking the state information of the intermediate product comprises:

detecting completion of the first activity; and responsive to detecting completion of the first activity, automatically adjusting the inventory level of the intermediate product within the ERP system to reflect production of the intermediate product.

18. A non-transitory computer-readable medium that stores instructions that, when executed by one or more processors, cause the one or more processors to perform operations comprising:

creating a production model within an enterprise resource planning (ERP) system, the production model representing a real-world process by relating a set of product components, a sequence of activities comprising a first activity and a second activity, and a final product to each other, without defining any intermediate products;

receiving user input to define an intermediate product;

responsive to receiving the user input to define the intermediate product, generating, within the ERP system, a master data record for the intermediate product;

receiving user input to include the intermediate product in the production model;

in response to receiving the user input to include the intermediate product in the production model, updating the production model based on the master data record to integrate the intermediate product into the sequence of activities, wherein the first activity produces the intermediate product and the second activity consumes the intermediate product; and executing a production order based on the production model, wherein execution of the production order comprises tracking, within the ERP system, state information of the intermediate product.

19. The non-transitory computer-readable medium of claim 18, wherein the state information of the intermediate product comprises at least one of: an inventory level of the intermediate product; a location of one or more units of the intermediate product; a location of a quantity of the intermediate product; batch information; or serial number information.

20. The non-transitory computer-readable medium of claim 19, wherein tracking the state information of the intermediate product comprises:

detecting completion of the first activity; and responsive to detecting completion of the first activity, automatically adjusting the inventory level of the intermediate product within the ERP system to reflect production of the intermediate product.

* * * * *